Nov. 24, 1964     D. C. REILLY     3,158,253
MOVABLE ROLLER SUPPORTS FOR EXTENSIBLE BELT CONVEYOR
Filed April 16, 1963     3 Sheets-Sheet 1
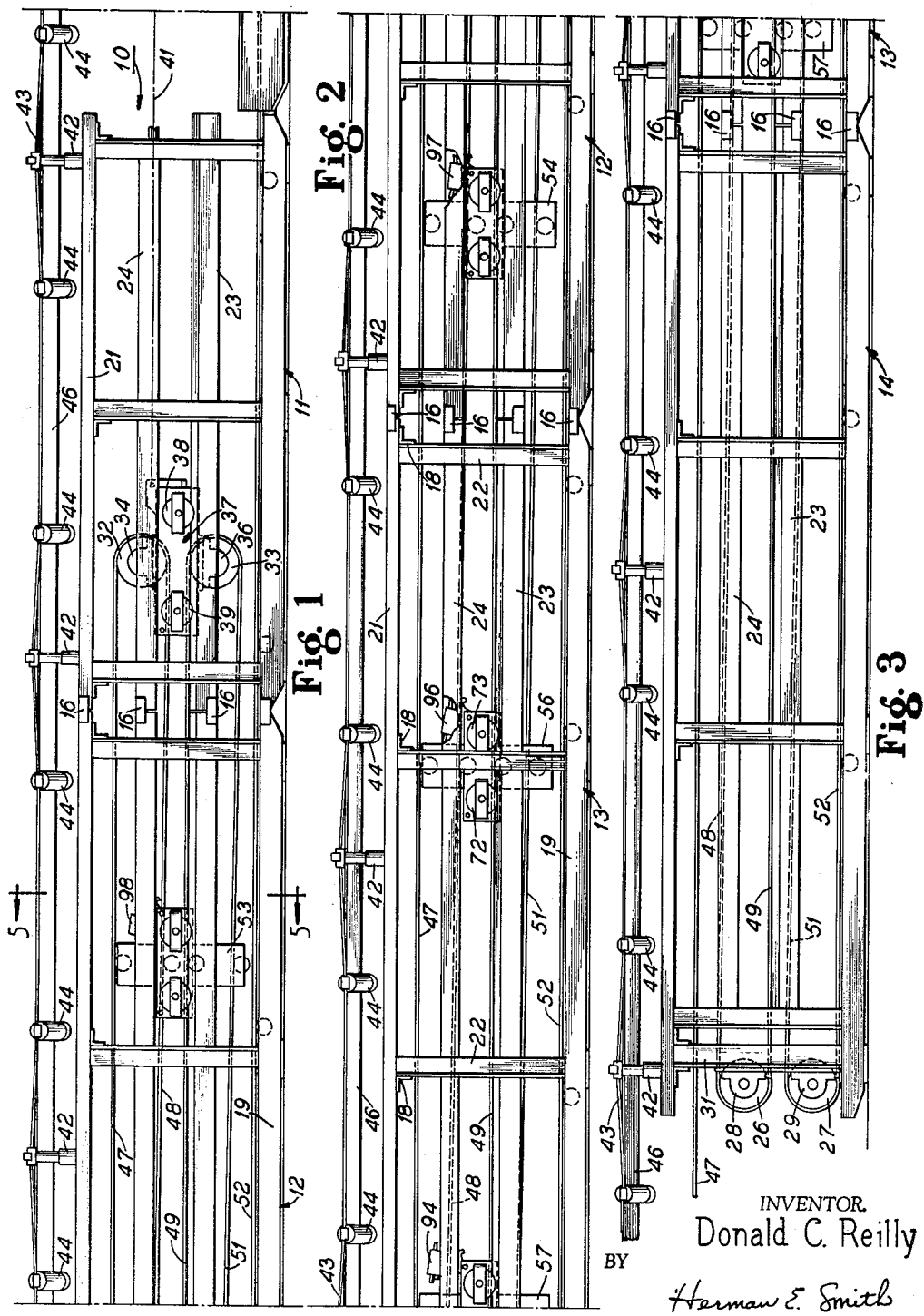
INVENTOR.
Donald C. Reilly
BY
Herman E. Smith
ATTORNEY

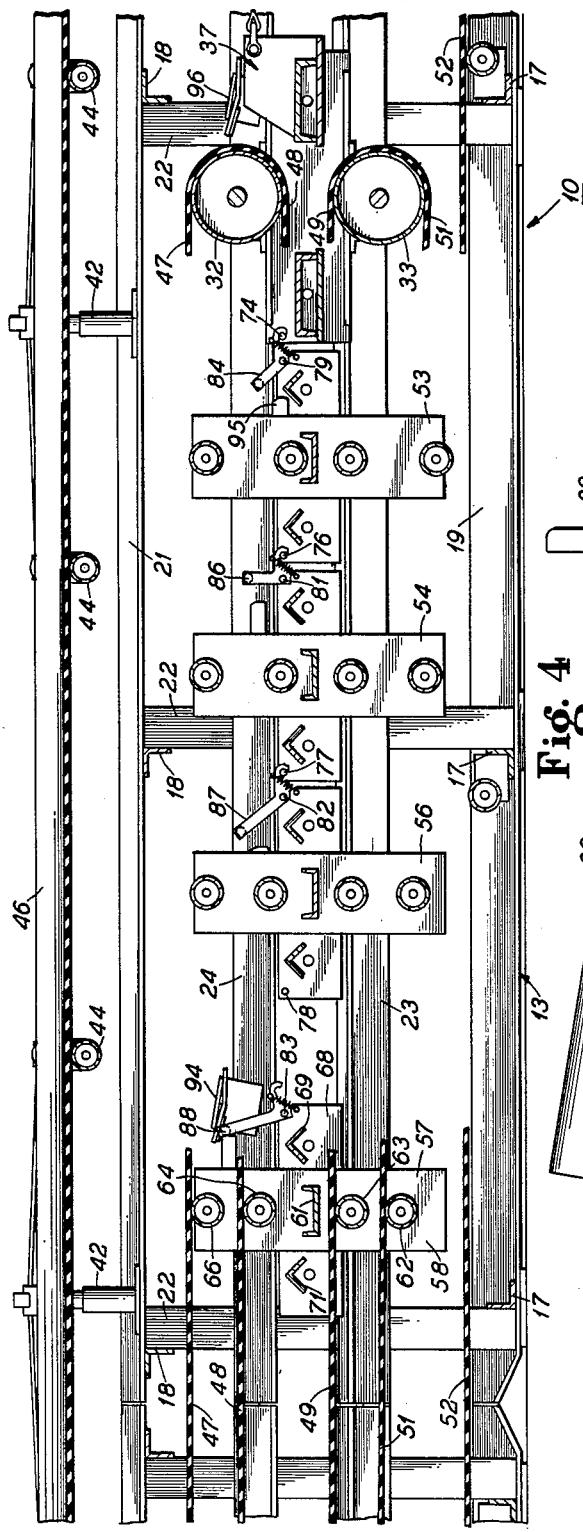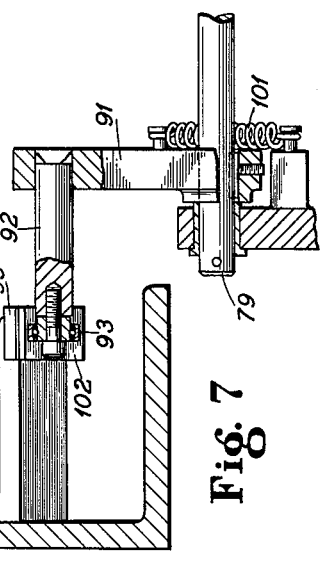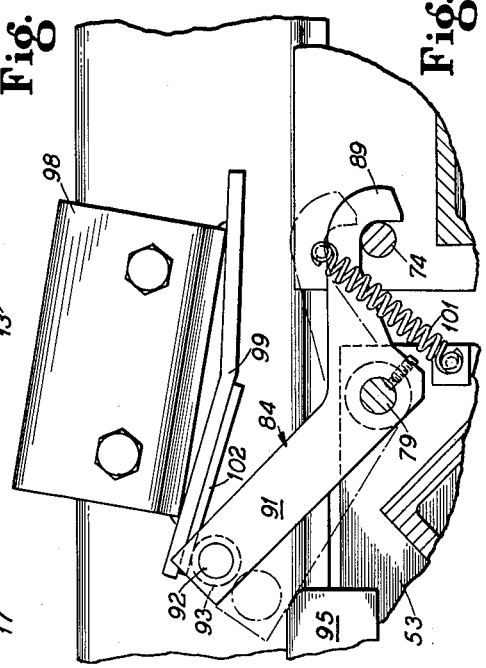
INVENTOR.
Donald C. Reilly
BY Herman E. Smith
ATTORNEY Nov. 24, 1964 D. C. REILLY 3,158,253
MOVABLE ROLLER SUPPORTS FOR EXTENSIBLE BELT CONVEYOR
Filed April 16, 1963 3 Sheets-Sheet 3

INVENTOR.
Donald C. Reilly
BY
Herman E. Smith
ATTORNEY

United States Patent Office 3,158,253
Patented Nov. 24, 1964

3,158,253
MOVABLE ROLLER SUPPORTS FOR EXTENSIBLE BELT CONVEYOR
Donald C. Reilly, Downers Grove, Ill., assignor to Goodman Manufacturing Company, Chicago, Ill., a corporation of Illinois
Filed Apr. 16, 1963, Ser. No. 273,355
8 Claims. (Cl. 198—139)

This invention relates generally to belt conveyors and more particularly to movable roller supports therefor.

In long belt conveyors it is customary to control the belt tension by paying out or taking up belt from a take-up section. Such take-up section is preferably located on the non-carrying reach of belt at a point of relatively low belt tension. It may take the form of a stack of fixed pulleys and a stack of movable pulleys with a portion of the belt reeved back and forth between the two pulley stacks. Where the conveyor is to operate at a fixed length, the above-described system compensates very well for belt stretch and surges of tension occasioned by starting torque, variable loading and the like.

The advent of continuously advancing tunneling machines and underground mining machines has resulted in a need for conveyors whose length can be gradually extended during a working cycle. By increasing the length of belt reeved in the take-up section, these conveyors, sometimes called "extensible," can be made to supply the additional belt requirements. In mining and tunneling applications the number of pulleys in a stack is limited by the available head room so that it becomes necessary to increase the span between pulley stacks. The unsupported span of belt must be kept below a length determined by the belt tension in order to prevent adjacent portions from slapping and abrading each other as they travel along in opposite directions in close proximity to each other.

Accordingly, it is a principal object of the present invention to provide nests of supporting and separating rollers which are movable along the take-up section to define the unsupported span of belt.

Another object is to provide nests of belt supporting rollers which are movable to spaced positions along the take-up section when the stacks of reversing pulleys are far apart.

A further object is to provide movable nests of belt supporting rollers which are automatically positionable at preselected locations along the take-up section.

Other objects and advantages will become apparent from the following specification, together with the drawings which illustrate a preferred embodiment of the invention.

In the drawings:

FIGURE 1 is an elevation view of an end portion of an extended take-up section showing a movable stack of belt reversing pulleys;

FIG. 2 is an intermediate portion of the take-up section shown in FIG. 1;

FIG. 3 is the other end portion of the take-up section shown in FIGS. 1 and 2 showing a fixed stack of belt reversing pulleys;

FIG. 4 is a section view of a portion of the take-up section, to enlarged scale;

FIG. 7 is an end view of a tripper and coupler; and

FIG. 8 is a side view of the tripper and coupler of FIG. 7.

Figure 5:
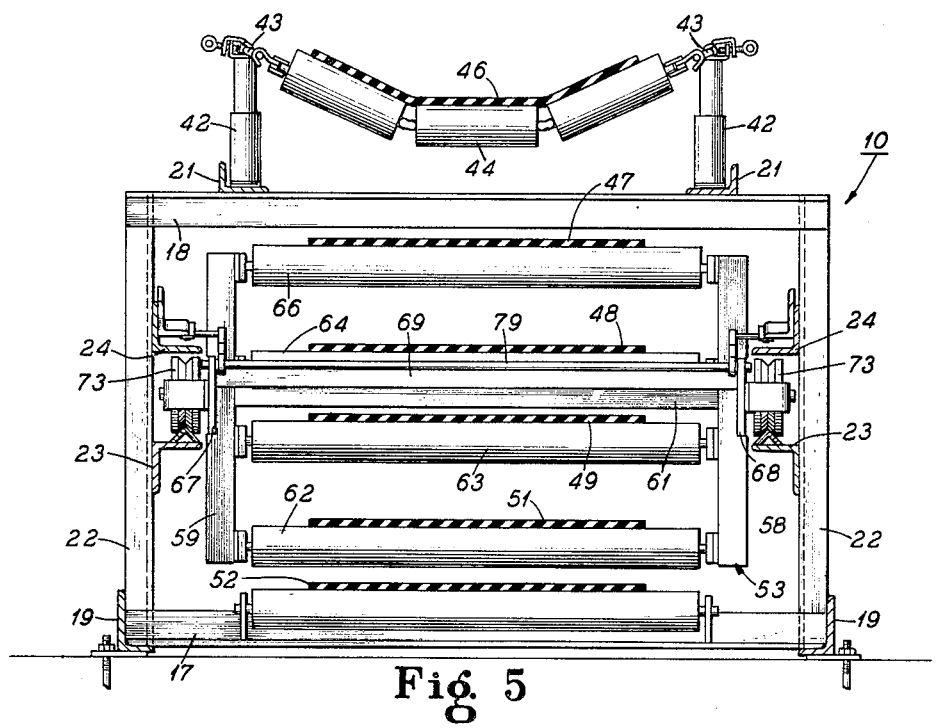
FIG. 5 is a cross section view of the conveyor take-up taken along the line 5—5 of FIG. 1.

Referring now more particularly to the drawings, the numeral 10 refers generally to the take-up section of a belt conveyor comprising a number of similar units 11, 12, 13 and 14 connected end-to-end by connectors 16 to form an extended take-up section useful with extensible conveyors. The total length of an extended take-up section can be varied by using more-or-less of the intermediate units 12 and 13. A typical intermediate unit has a frame comprising transverse members 17 and 18, bottom beams 19, top beams 21, upright members 22 and rails 23 and 24.

A stack of fixed belt reversing pulleys 26 and 27 is shown at the left end of unit 14 in FIG. 3. Pulleys 26 and 27 are supported in bearings 28 and 29 which, in turn, are supported on upright member 31. Movable belt reversing pulleys 32 and 33 are shown on unit 11 in FIG. 1. Pulleys 32 and 33 are supported on bearings 34 and 36 which are mounted on movable carriage 37. Carriage 37 has two pairs of wheels 38 and 39 which ride on rails 23. Broken line 41 indicates a wire rope connected to carriage 37 for moving the carriage to the right as viewed in FIG. 1.

A number of upright stands 42 extend above the take-up section 10 and support a pair of wire ropes 43 forming the sideframes of a rope sideframe conveyor. Belt supporting troughing roller assemblies 44 are connected to rope sideframes 43 and support a carrying reach of the conveyor belt 46. A portion of the belt return reach 47 is shown leaving the take-up section at the left end of unit 14 in FIG. 3. Portion 47 extends toward and around movable pulley 32. From pulley 32 the belt extends toward and around fixed pulley 26 and is designated by the reference character 48. The belt then extends from fixed pulley 26 toward and around movable pulley 33 and is designated 49. Belt portion 51 extends from movable pulley 33 toward and around fixed pulley 27 and belt portion 52 extends away from fixed pulley 27. Belt carrying reach 46 is joined to return portion 47 and passes around a tail pulley not shown in the drawings; portion 52 is joined to carrying reach 46 and passes around a head pulley not shown, thus forming a continuous length of orbitally movable belt.

As illustrated in FIGS. 1 through 4, four nests of movable belt supporting rollers 53, 54, 56 and 57, are located between the fixed and movable stacks of pulleys. A typical roller nest has a pair of transversely spaced uprights 58, 59 spaced apart by cross member 61 and belt supporting rollers 62, 63, 64 and 66. Longitudinal members 67, 68 extend along uprights 59, 58 and are spaced apart by cross members 69 and 71. A pair of wheels 72, 73 is journaled to each member 67, 68 for supporting and guiding the respective roller nests along each rail 23.

Referring now to FIGS. 4, 7 and 8, pulley carriage 37 has a cross bar 74 near the left end thereof. Each roller nest 53, 54, 56 has a similar bar 76, 77, 78. The right end of each roller nest has a cross bar 79, 81, 82, 83 on which is pivoted a coupler 84, 86, 87, 88. Each coupler is in the general form of a bell crank and has a forwardly extending hook portion 89 adapted to engage the cross bar of the roller nest or pulley carriage immediately to its right. Extending angularly away from hook 89 is an operating lever 91 which provides a control device for actuating the coupler. Each operating lever 91 has a pin 92 extending therefrom which may have a roller 93 mounted thereon forming an actuating surface. The actuating surfaces of respective couplers are spaced in a regular order of different heights from rail 23. The actuating surface on coupler 84 being closest to rail 23 and the actuating surface of coupler 88 being furthest from rail 23. A series of trtippers 94, 96, 97, 98 are spaced along the take-up section. Each tripper has an inclined face 99 for engaging one of the actuating rollers 93. The vertical spacing of trippers 94, 96, 97, 98 above rail 23 is different from each tripper and corresponds to the positions of actuator surfaces 93 on respective couplers 84, 86, 87 and 88. For example, the inclined face of tripper 94 is spaced vertically above rail 23 so as to engage the roller 93 on coupler 88 but allow couplers 87, 86 and 84 to pass under. Similarly, tripper 96 will engage coupler 87 and allow couplers 86 and 84 to pass under. Tripper 97 will engage coupler 86 allowing coupler 84 to pass under and tripper 98 will engage coupler 84 allowing the pulley carriage to pass under. Thus the various roller nests can be automatically spaced apart along the take-up section at preselected positions when the movable stack of pulleys is moved away from the fixed pulley stack. The entire belt span in the take-up section is divided into a number of smaller spans whose length is short enough to prevent adjacent portions of belt from slapping and abrading each other.

Figure 6:
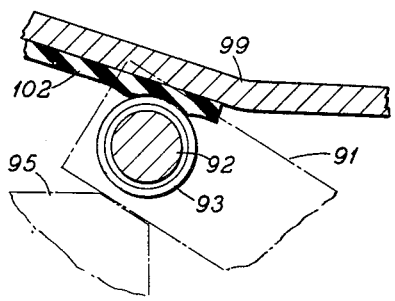
FIG. 6 is a fragmentary detail view, to enlarged scale, showing the interaction of a tripper with a portion of a roller nest.

When the movable belt carriage 37 is moved toward the fixed pulley stack, adjacent roller nests are coupled together and to the movable carriage. As the carriage 37 moves to the left, as viewed in FIG. 8, it moves roller nest 53 to the left so that actuating roller 93 moves from engagement with face 99. Spring 101 then pulls hook 89 down into engagement with cross bar 74, coupling the two members together.

Where the inclination of the conveyor is such that the roller nests are apt to coast away from the preselceted position determined by trippers 94, 96, 97 and 98 the inclined tripper face 99 may be covered with a resilient elastomeric material 102. As shown in FIG. 6, engagement of actuating roller 93 with material 102 deforms material 102 to form a depression capable of gripping roller 93 and holding the respective roller nest in position. A stop 95 provides firm support for operating lever 91 when roller 93 is gripped by material 102.

In operation, pulley carriage 37 moves to the left in the figures as the carrying reach of the roller is extended. In moving toward the left, carriage 37 first engages roller nest 53 and dislodges it from the gripping engagement provided by actuator roller 93 and material 102. When dislodged, spring 101 pulls hook 89 downward into engagement with cross bar 74. Carriage 37 and roller nest 53 continue toward the left as the length of the conveyor is increased, successively dislodging and coupling roller nests 54, 56 and 57. At the end of a working cycle, an additional length of belt is spliced into the system and carriage 37 is moved toward the right in the figures to establish proper belt tension. As the carriage is moved toward the right, it pulls the various roller nests along with it. As the group of serially connected roller nests and carriage move past tripper 94, roller nest 57 is uncoupled from the group, and gripped by material 102 to hold it in position. As the group moves further toward the right, roller nest 56 is uncoupled at tripper 96 and so on until the pulleys and roller nests form a series of spaced supports for adjacent portions of belt.

While I have shown and described a preferred embodiment of my invention, it is to be understood that other forms and modifications can be practiced within the spirit of the invention and the scope of the following claims.

I claim:

1. In an extended take-up section for a belt conveyor;
a frame;
nests of belt supporting rollers adapted to move forward and back along said frame;
releasable coupling means on said roller nests for connecting said nests to each other; and
selective engaging apparatus spaced along said frame adapted to de-couple preselected roller nests at preselected locations along said frame.

2. In an extended take-up section for a belt conveyor;
a frame;
nests of belt supporting rollers adapted to move forward and back along said frame;
releasable coupling means on said roller nests connecting said nests to each other;
selective engaging apparatus spaced along said frame adapted to de-couple preselected roller nests at preselected locations along said frame; and
gripping devices on said engaging apparatus adapted to hold a de-coupled roller nest at a preselected location on said frame.

3. In an extended take-up section for a belt conveyor;
a frame;
a rail extending along said frame;
nests of belt supporting rollers adapted to move forward and back along said rail;
releasable coupler means on each roller nest arranged to connect adjacent roller nests to each other for movement together along said rail;
a coupler operating device on each roller nest, movable between first and second positions for respectively connecting and disconnecting said coupler means;
an actuating surface on each operating device, said actuating surfaces on successive roller nests being disposed in a regular staggered sequence of spacings from said rail; and
engaging surfaces disposed at preselected positions along said frame, successive engaging surfaces being disposed in a regular staggered sequence of spacings from said rail, each engaging surface aligned with a respective actuating surface, whereby respective operating devices are movable between said first and second positions responsive to movement of respective nests forward and back along said rail.

4. In an extended take-up section for a belt conveyor;
a frame;
a rail extending along said frame;
nests of belt supporting rollers on said frame, each nest adapted to move forward and back in a prescribed path between a respective one of spaced intermediate positions along said rail and a common position at one end thereof;
releasable coupler means on said roller nests adapted to serially connect adjacent roller nests for movement together over the prescribed path of one of them;
a control device for each coupler means having an actuating surface spaced from said rail, the actuating surfaces on adjacent control devices being staggered with respect to each other; and
trippers spaced along said frame, each tripper defining the limit of the path of travel of one of said roller nests, respective trippers being aligned with respective actuating surfaces,
whereby preselected roller nests are disconnected from adjacent roller nests upon movement past a respective tripper.

5. In an extended take-up section for a belt conveyor;
a frame;
a rail extending along said frame;
a plurality of trippers on said frame spaced along said rail, said trippers being arranged in a regular order of different transverse spacings from said rail;
a plurality of roller nests on said frame adapted for movement along said rail, each roller nest adapted to travel over a path defined by one end portion of said rail and a respective one of said trippers;
coupler means on each roller nest movable toward and from a coupling position, said coupler means connecting adjacent roller nests to each other in the coupling position; and
actuator means on each coupler means aligned with a respective one of said trippers, said actuator means being adapted to move said coupler means from said coupling position responsive to engagement with a respective one of said trippers.

6. In an extended take-up section for a belt conveyor;
a frame;
a rail extending along said frame;
a plurality of trippers on said frame spaced longitudinally along said rail, each tripper having an inclined working face, the working faces of successive trippers being vertically displaced with respect to each other;
a plurality of roller nests on said frame adapted for movement along said rail;
coupler means on each roller nest movable toward and from a coupling position, said coupler means interconnecting adjacent roller nests in the coupling position; and
actuating projections on each coupler means effective to move said coupler means toward and from said coupling position responsive to vertical displacement thereof, each of said actuating projections being aligned with a respective one of said trippers,
whereby respective coupler means are movable toward and from said coupling positions responsive to movement of a respective roller nest along a portion of said rail proximate a respective one of said trippers.

7. In an extended take-up section for a belt conveyor;
a frame;
a rail extending along said frame;
a plurality of trippers on said frame spaced along said rail, said trippers being arranged in a regular order of different transverse spacings from said rail;
resilient gripping means on each tripper;
a plurality of serially connected roller nests on said frame adapted for movement along said rail, each roller nest adapted to travel over a path defined by one end portion of said rail and a respective one of said trippers;
coupler means on each roller nest movable toward and from a coupling position, said coupler means being effective to disconnect adjacent roller nests from each other; and
actuator means on each coupler means aligned with a respective one of said trippers, said actuator means being adapted to move said coupler means from said coupling position responsive to engagement with a respective one of said trippers, said resilient gripping means being effective to hold said coupler means in said position.

8. In an extended take-up section for a belt conveyor;
a frame;
a rail extending along said frame;
a plurality of trippers on said frame spaced longitudinally along said rail, successive trippers being vertically displaced with respect to each other, each tripper having an inclined face covered with a resilient elastomeric material;
a stack of reversing pulleys movable along said rail;
a plurality of roller nests movable along said rail;
a pivotally mounted hook extending forwardly from each roller nest, adapted to serially connect said roller nests to each other and to the said stack of reversing pulleys;
stop means on each roller nest adapted to limit the movement of a respective hook; and
an actuating surface on each hook adapted to move said hook between connected and disconnected positions responsive to vertical displacement thereof, the actuating surfaces on successive hooks being aligned with respective ones of said trippers,
whereby movement of a group of serially connected roller nests forwardly along said rail is effective to engage the actuating surface on the rearmost roller nest with the face of the rearmost tripper, said engagement being effective to disconnect said rearmost roller nest from the group and hold said roller nest in fixed position along said rail.

References Cited in the file of this patent

UNITED STATES PATENTS

| | | |
|---|---|---|
| 1,748,301 | McKinlay | Feb. 25, 1930 |
| 2,904,164 | Bergmann et al. | Sept. 15, 1959 |
| 2,992,723 | Poundstone | July 18, 1961 |